United States Patent [19]

Anttila et al.

[11] Patent Number: 4,655,669
[45] Date of Patent: Apr. 7, 1987

[54] APPARATUS FOR HANDLING UNITARY LOADS

[75] Inventors: Arjo Anttila; Risto Paloposki; Keijo Kröger, all of Tampere, Finland

[73] Assignee: Valmet Oy, Finland

[21] Appl. No.: 747,274

[22] Filed: Jun. 21, 1985

[30] Foreign Application Priority Data

Jun. 26, 1984 [FI] Finland ................................. 842569

[51] Int. Cl.$^4$ .......................... B60P 3/40; B60P 1/64
[52] U.S. Cl. ................................ 414/458; 280/43.23;
414/607; 414/786; 414/909
[58] Field of Search ............... 414/458, 459, 498, 607,
414/608, 909, 786; 280/43.23

[56] References Cited

U.S. PATENT DOCUMENTS

| | | | |
|---|---|---|---|
| 2,584,240 | 2/1952 | Stewart | 414/607 X |
| 3,348,711 | 10/1967 | Gove | 414/459 |
| 3,476,275 | 11/1969 | Cowlishaw et al. | 414/498 |
| 3,647,014 | 3/1972 | Wilke et al. | 414/498 X |
| 4,077,535 | 3/1978 | Oriol | 414/498 |
| 4,252,495 | 2/1981 | Cook | 414/608 |
| 4,400,130 | 8/1923 | Antilla et al. | 414/478 |
| 4,551,059 | 11/1985 | Petoia | 414/909 X |
| 4,588,345 | 1/1985 | Antilla | 414/458 |

FOREIGN PATENT DOCUMENTS 61435 4/1982 Finland.

Primary Examiner—Robert J. Spar
Assistant Examiner—Stuart J. Millman
Attorney, Agent, or Firm—Steinberg & Raskin

[57] ABSTRACT

Apparatus for handling unitary loads, such as containers, concrete elements, plate-shaped objects and the like, include a prime mover, such as a power vehicle or the like, which is equipped with a mechanism for engaging and raising one end of the load from the surface to which it rests, and an auxiliary device equipped with wheels which is separate from the prime mover and which supports the load during the handling operation. The auxiliary device is self-propelled and is controlled by an operator who can be situated in a cab of the prime mover. In operation, one end of the unitary load is raised from the base surface on which it rests by means of the engagement members of the prime mover whereupon the auxiliary device is positioned beneath the load to engage the same. The auxiliary device is propelled towards the opposite end of the load so that the latter is raised from the base surface with the load being supported on its underside by the auxiliary device so that the load can then be moved. The auxiliary device can be controlled through power supply cables coupled with the prime mover or through remote control.

17 Claims, 12 Drawing Figures

APPARATUS FOR HANDLING UNITARY LOADS

BACKGROUND OF THE INVENTION

The present invention relates generally to apparatus for handling unitary loads, such as containers, concrete elements, plate-shaped objects and the like and, more particularly, to apparatus for handling unitary loads which include a prime mover, such as a power vehicle or the like, equipped with means for engaging and raising one end of the load from the base surface on which it rests.

The handling of large unitary loads, such as containers, is inconvenient, especially where available space in the vicinity of the load is limited. For example, the handling of containers at shipping docks where RO-RO vessels are loaded and unloaded can be quite difficult due to the limited available space.

Shipping containers are usually so large and heavy that it is not possible to move them by lifting only one of their ends. For this reason, several different techniques have been developed for handling containers in ports. One known technique utilizes a straddle carrier which comprises a large mobile crane having widely spaced wheels mounted on an inverted substantially U-shaped frame defining an open space which permits the crane to be driven over the container. The drawback of straddle carriers is that their use prevents containers from being loaded when they are situated in immediate side-by-side relationship with each other since the wheels of the straddle carrier require space on both sides of the container.

Trailers have been used to move containers or similar unitary loads. However, a separate crane or power truck is required to lift each container onto and from the trailer. This technique is not economical since the trailer itself constitutes a large, bulky piece of equipment which must be maneuvered through areas which are often quite limited. Additionally, the required number of trailers which must be kept on hand is often considerably larger than the cargo capacity of container carrying vessels thereby resulting in large expenditures which are often unnecessary.

Various arrangements have been suggested for overcoming the above-described disadvantages of conventional unitary load handling equipment. For example, load handling equipment is disclosed in Finnish Pat. No. 61,435 corresponding to U.S. Pat. No. 4,400,130, which comprises a lifting unit and a movable bogie unit connected to a prime mover by means of a telescopic frame. In operation, one end of a container is first lifted whereupon the bogie unit is moved under the container with the aid of the telescopic frame so that the bogie unit is positioned beneath the container in an area between the opposite end of the container and its center of gravity.

SUMMARY OF THE INVENTION

It is an object of the present invention to provide new and improved handling apparatus for large unitary loads.

It is another object of the present invention to provide new and improved handling apparatus for large unitary loads, such as containers, concrete elements and large plate-shaped members, which overcome the disadvantages of conventional apparatus described above.

Briefly, in accordance with the present invention, these and other objects are obtained by providing handling apparatus comprising a prime mover, such as a truck or other similar powered vehicle, equipped with engagement members for raising one end of the load from the surface of which it rests and a separate, mobile auxiliary device which is self-propelled and adapted to be controlled from a remote location, such as from the operator's cab of the prime mover, so that when the prime mover and associated engagement members raise one end of the load from the base surface on which it rests, the auxiliary device can be moved under the load to lift the opposite end thereof from the base surface and to support the load on its underside for subsequent movement. Means are preferably provided for associating the prime mover with the auxiliary device when the latter is not supporting the load.

An important advantage of apparatus in accordance with the invention is that a conventional power truck or similar vehicle equipped with lifting means can be utilized as the prime mover so that it is only necessary to provide an auxiliary device of the type described above to convert the conventional apparatus into handling apparatus in accordance with the invention. Apparatus in accordance with the invention are well suited for handling, for example, standard-sized containers or similar loads, especially over short distances, such as in shipping terminals.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
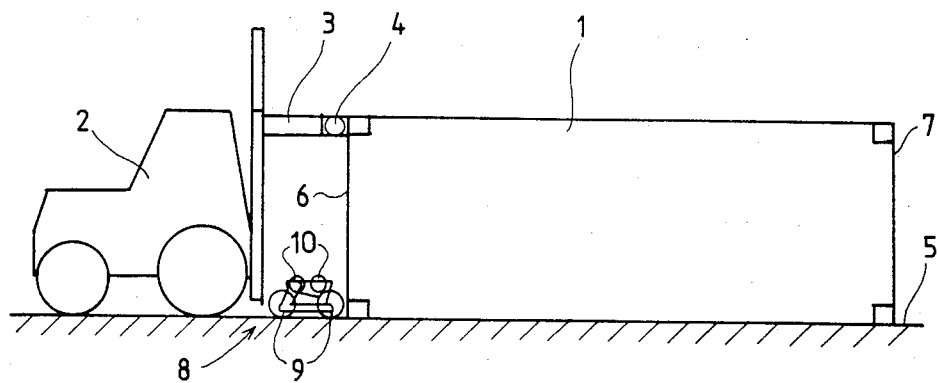
FIG. 1 is a schematic side elevation view of apparatus in accordance with the invention in the process of engaging a container.

Referring now to the drawings wherein like reference characters designate identical or corresponding parts throughout the several views, and more particularly to FIG. 1, unitary load handling apparatus in accordance with the invention are illustrated for moving a unitary load, such as a container 1. The handling apparatus comprises a prime mover 2, which in the illustrated embodiment comprises a fork-lift truck, and an auxiliary device 8 adapted to be driven under the container 1 for supporting the latter during handling. The auxiliary device 8 is equipped with traction wheels 9 and with rollers 10 that engage and roll along the bottom of container 1 as the auxiliary device 8 is moved underneath container 1 to a position where it supports the latter. The prime mover 2 is a conventional fork-lift truck provided with a fork 3 on which engagement members 4 are provided which are adapted to engage openings in the corners of container 1 during lifting of the end of container 1 which is proximate to the truck 2. Since the auxiliary device 8 is a separate unit, i.e., is separate from the prime mover 2, at least one of the traction wheels 9 and/or one of the support rollers 10 must be driven in order to move the auxiliary device 8. In other words, the auxiliary device 8 is provided with means for self-propulsion.

Figure 2:
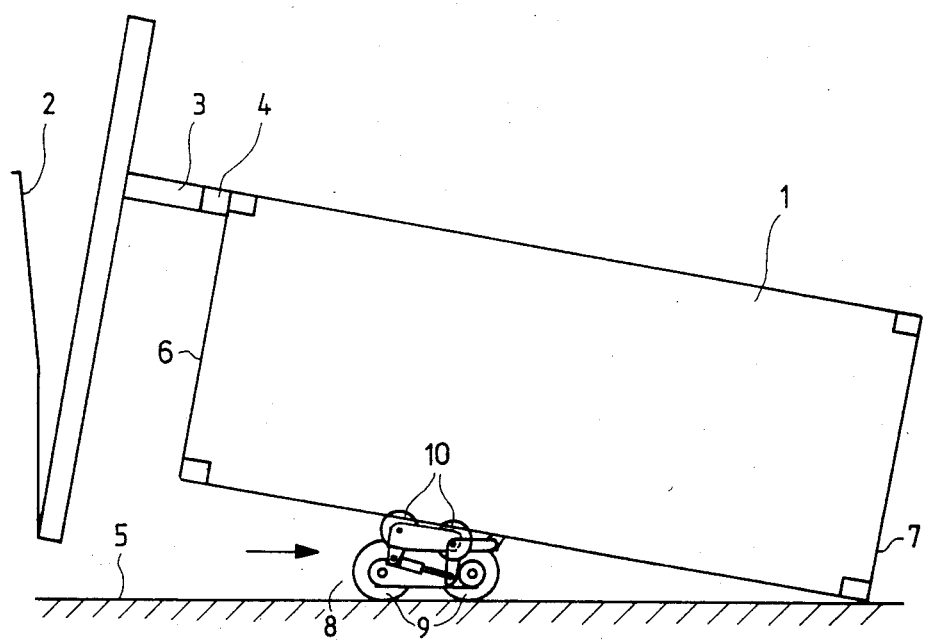
FIG. 2 is a schematic side elevation view of the next stage of the operation of the apparatus shown in FIG. 1 wherein one end of the container has been raised and wherein the auxiliary device is moving into position under the container.
Figure 2A:
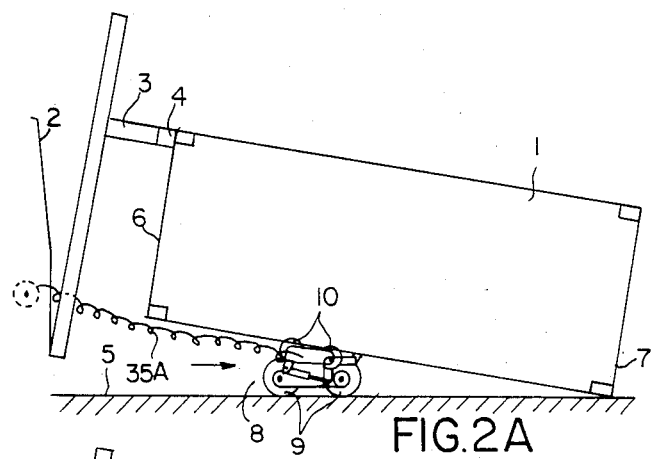
FIG. 2A illustrates an embodiment wherein the motor of the auxiliary device is an electric motor.
Figure 2B:
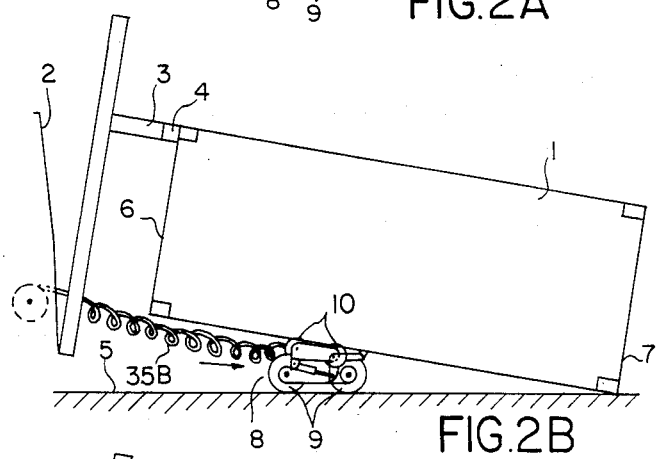
FIG. 2B illustrates an embodiment wherein the motor of the auxiliary device is a hydraulic motor.
Figure 2C:
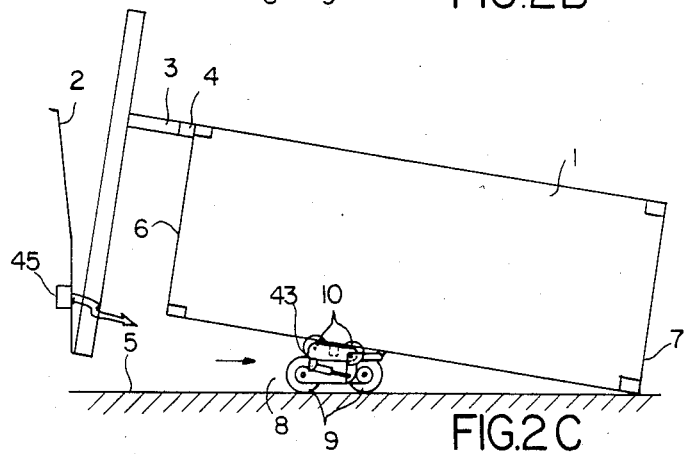
FIG. 2C illustrates an embodiment wherein the auxiliary device is controlled through wireless remote control.

Referring to FIG. 2, the engagement members 4 of the fork-lift truck 2 engage openings in the top corners of the proximal end 6 of the container 1 and the fork 3 raised to lift the container end 6 from the base surface 5 on which it rested. The opposite or distal end 7 of container 1 remains on the base surface 5 during lifting. When the proximal end 6 of container 1 has been raised to a sufficient height, the auxiliary device 8 starts to move under container 1 towards the distal end 7 of the container with the rollers 10 engaging the bottom of container 1. The movement of auxiliary device 8 towards the distal end 7 of container 1 is terminated after the auxiliary device has moved a sufficient distance to permit pivoting of the container 1 into a horizontal position by lowering the fork 3. If necessary, the auxiliary device 8 can be moved towards or to the distal end 7 of container 1 even after the container 1 has been pivoted to its horizontal position. The auxiliary device 8 is most preferably moved to a position between the distal end 7 of container 1 and the center of gravity of the container which most preferably is situated at the center of the container. After the auxiliary device 8 has reached a suitable position beneath container 1 and the container pivoted to its horizontal position, the container can be moved by the load handling apparatus comprising the truck 2 and auxiliary device 8.

Container 1 is unloaded or lowered essentially by a reversal of the procedure described above. For example, after the container 1 has been moved to its desired location, the auxiliary device 8 is activated to start moving towards truck 2. At the same time, the lifting means comprising the fork 3 and engagement members 4 of truck 2 slightly lift the proximal end 6 of container 1. After the auxiliary device 8 has moved a certain distance under the container 1 towards the truck 2, the distal end 7 of container 1 engages the base surface 5 whereupon the auxiliary device 8 can be moved entirely from under container 1. The proximal end 6 of container 1 is then lowered by truck 2 onto the base surface 5.

Figure 3:
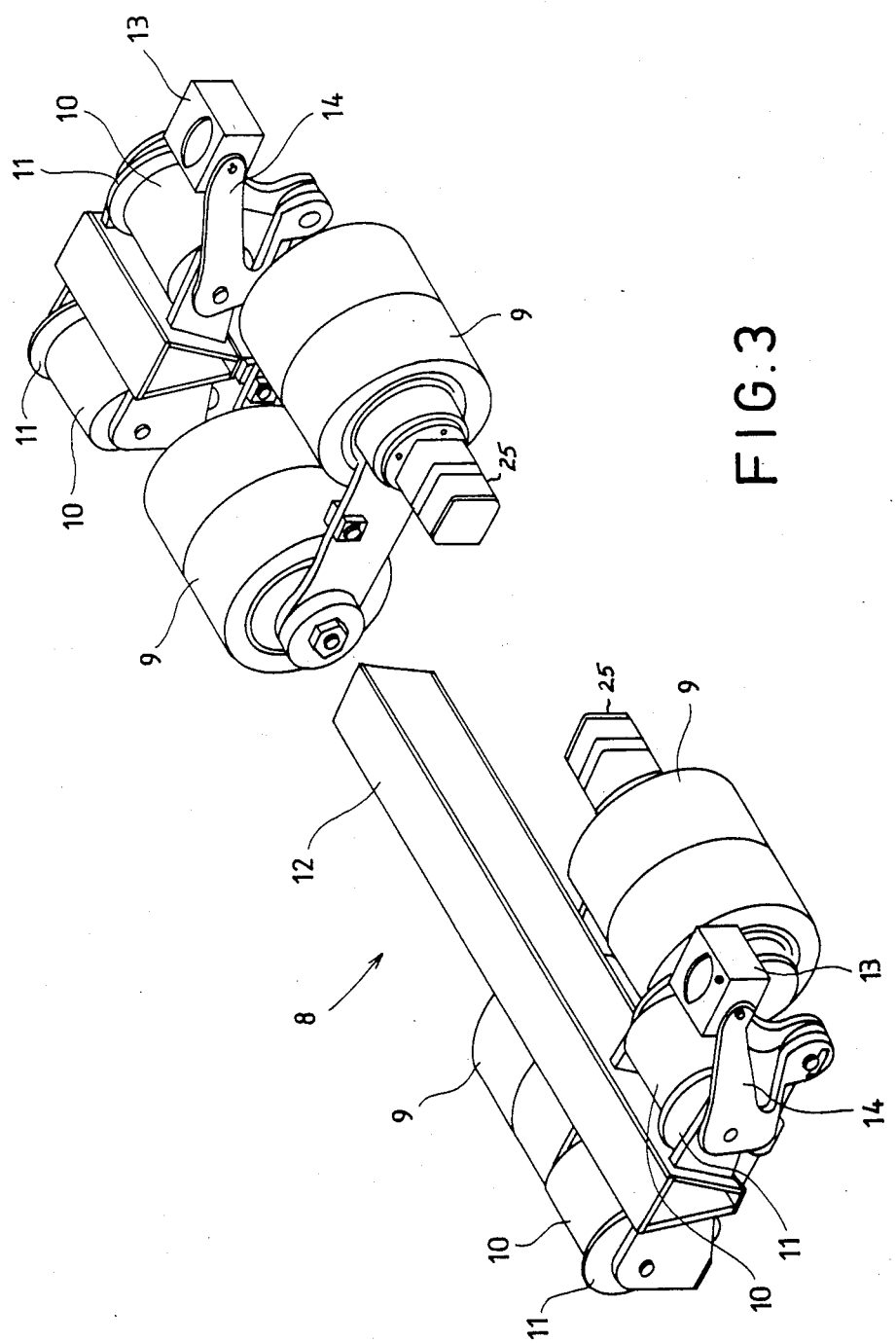
FIG. 3 is a perspective view, partially broken away, of an auxiliary device comprising a component of load handling apparatus in accordance with the invention.
Figure 3A:
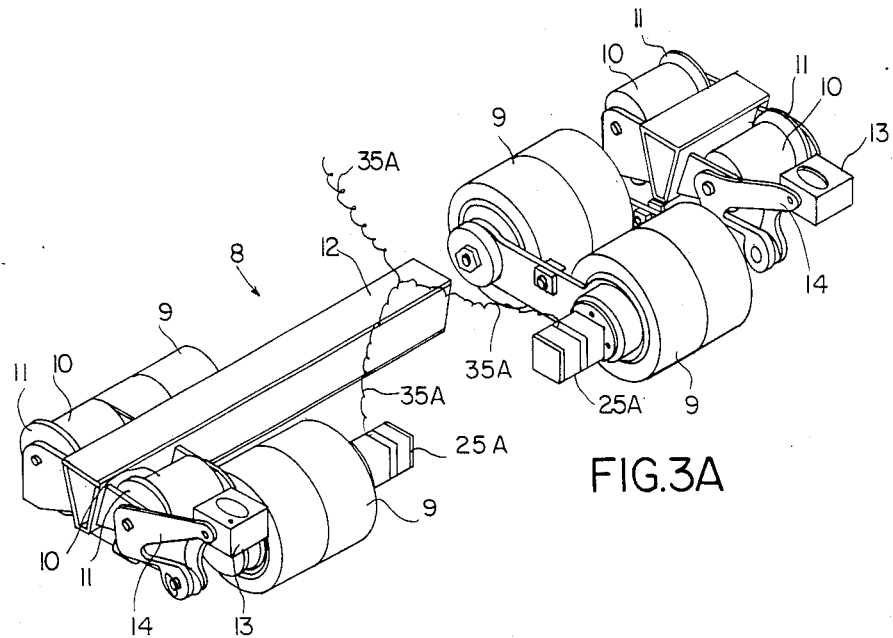
FIG. 3A illustrates an embodiment wherein the motor of the auxiliary device is an electric motor.
Figure 3B:
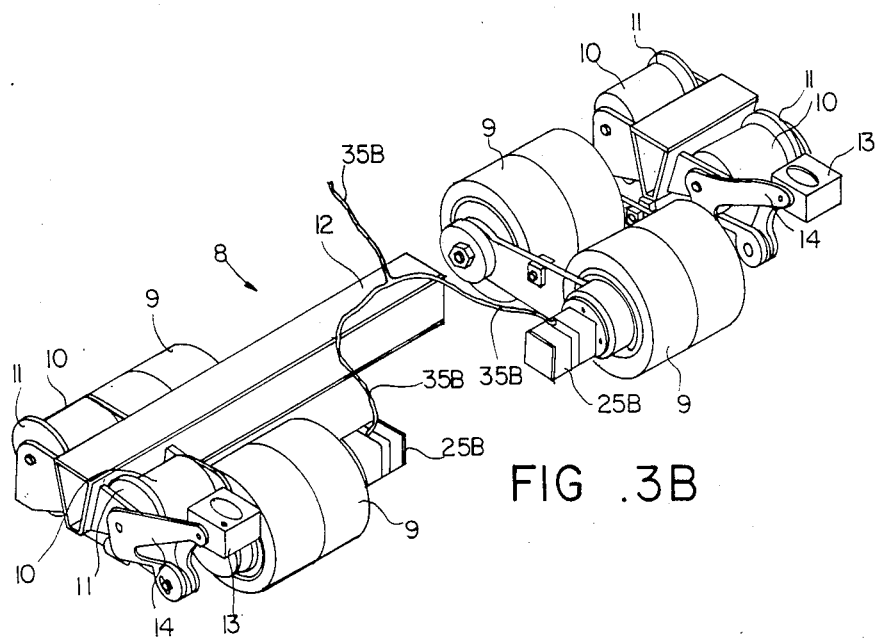
FIG. 3B illustrates an embodiment wherein the motor of the auxiliary device is a hydraulic motor.
Figure 3C:
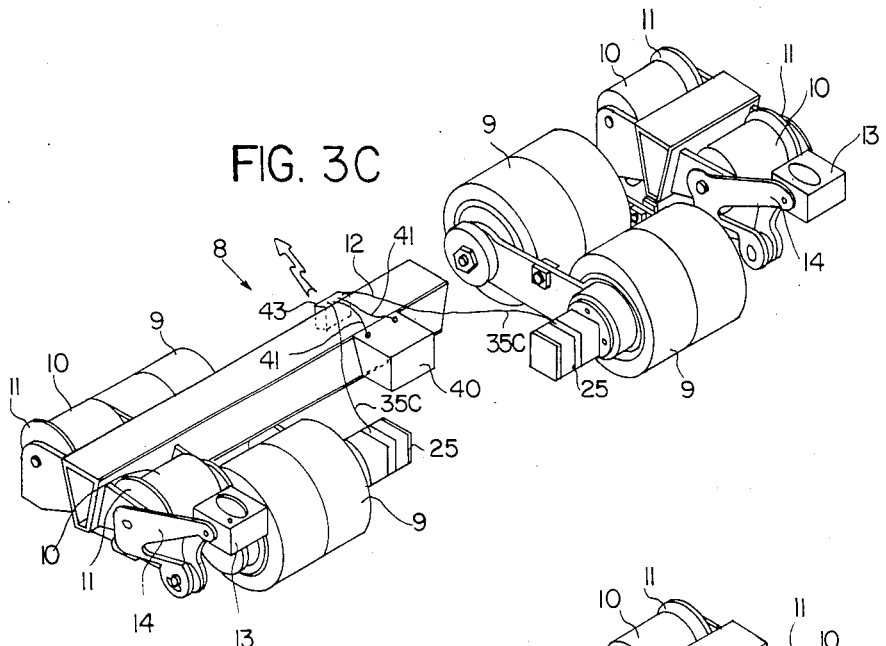
FIG. 3C illustrates an embodiment wherein the auxiliary device is controlled through wireless remote control.
Figure 3D:
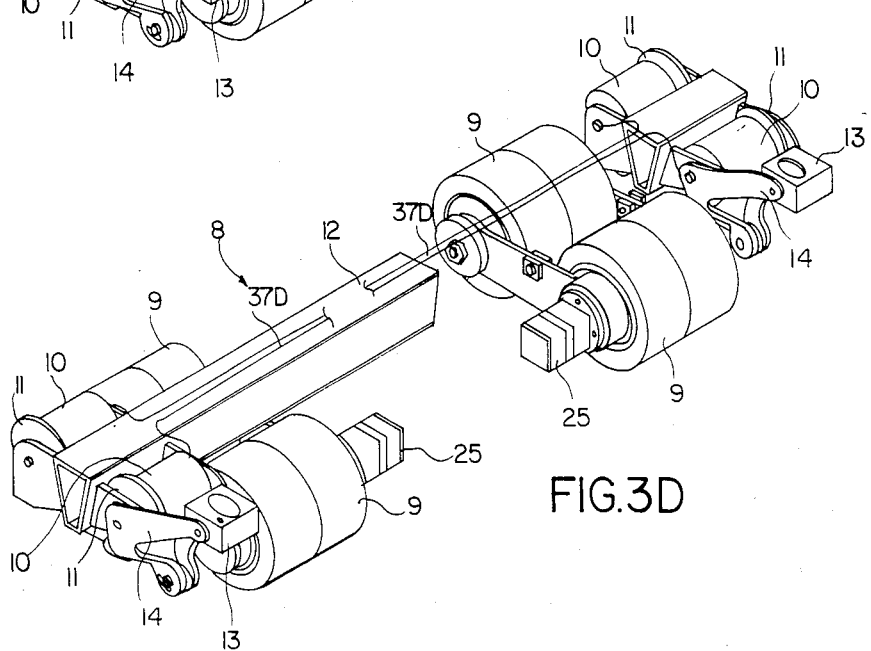
FIG. 3D illustrates an embodiment wherein cables extend to the brakes of support rollers and to the engagement members.

Referring now to FIG. 3, a perspective view of one embodiment of an auxiliary device 8 of load handling apparatus in accordance with the invention is illustrated. Auxiliary device 8 comprises a frame including a transversely extending beam 12 having a length sufficient to extend over the entire width of container 1. Traction wheels 9 are provided at each end of beam 12 in a bogie construction. The bogie is pivotally connected to the frame beam 12 so that the traction wheels 9 can pivot about an axis which is parallel to the longitudinal direction of beam 12. Rollers 10 for engaging and supporting container 1 are provided at the extreme ends of the beam 12. Four such support rollers 10 are provided, two at each respective end of beam 12. The pairs of support rollers 10 are spaced from each a distance which corresponds to the width of container 1. A flange 11 is provided at the outer end of each of the support rollers 10 which engage the sides of container 1 to facilitate guidance of the auxiliary device 8 as it moves beneath container 1 so as to maintain the auxiliary device 8 in correct alignment under container 1.

Figure 4:
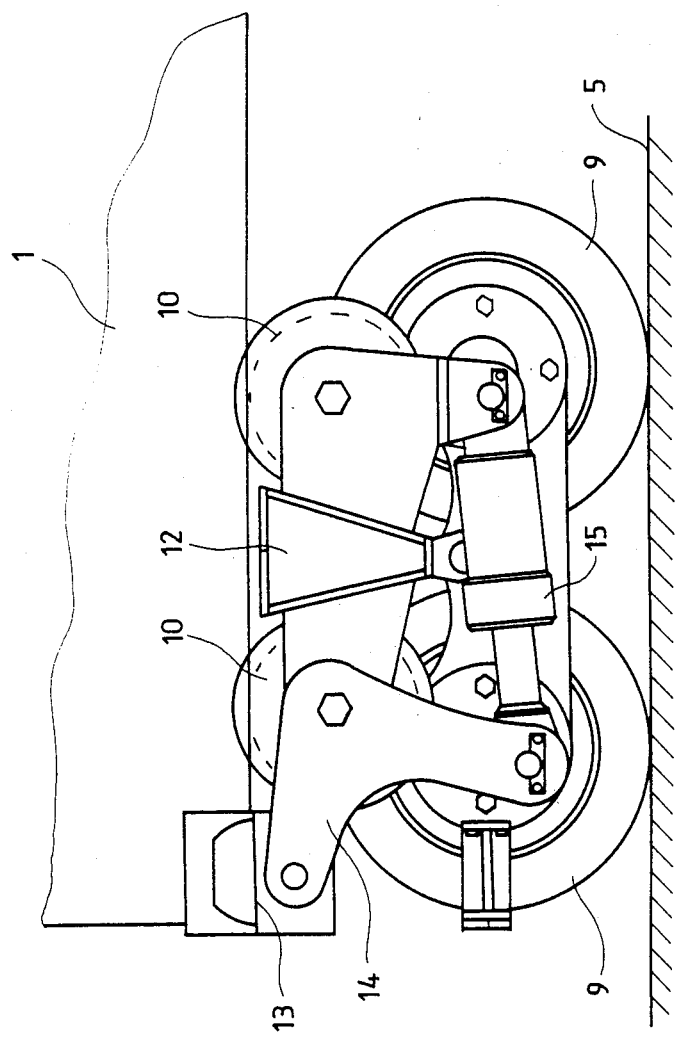
FIG. 4 is a schematic side elevation view of the auxiliary device shown in FIG. 3 engaging the underside of a container.

Referring to FIG. 4 in conjunction with FIG. 3, means for locking the auxiliary device 8 to container 1 during handling of the container may be provided if desired. The locking means include two pairs of connecting members 14, each connecting member of each pair being pivotally mounted to the auxiliary device 8 on a respective side of a respective pair of support rollers 10. The connecting members have the form of angled levers 14, the ends of associated levers of each pair being pivotally connected to an attachment member 13 which is adapted to engage openings provided at the lower corners of container 1. The other end of each lever 14 is pivotally connected to the piston of a hydraulic cylinder 15. Actuation of the hydraulic cylinder 15 thereby causes the engagement members 13 to be selectively raised and lowered to engage and disengage the openings formed in container 1.

Other means than those shown in FIGS. 3 and 4 may be provided for locking the auxiliary device 8 to the container 1. For example, hook-like connecting members or pressure flanges may be fitted on each end of the frame beam 12 which can be controlled to press against the sides of container 1. Such locking means would be preferable to those shown in FIGS. 3 and 4 in that such means would permit the auxiliary device 8 to be attached to the container 1 at any point over the length of the container 1. On the other hand, the locking means shown in FIGS. 3 and 4 can be attached to the container 1 only at those points where openings for receiving the attachment members 13 are provided. The auxiliary device 8 can also be fixed with respect to container 1 by providing the support rollers 10 with brakes or equivalent means for stopping their rotation. Such an arrangement would also permit the auxiliary device 8 to be fixed in any position under the container 1.

The self-propulsion of the auxiliary device 8 is accomplished through providing one or more of the traction wheels 9 with their own drive motor 25 (FIG. 3). Alternatively or additionally, the auxiliary device 8 can be propelled by providing means for driving one or more of the support rollers 10. In this case, the operation of the load handling apparatus will be slightly different from that described above in that after the prime mover has raised the proximal end 6 of container 1 to a suitable height, it is necessary to use external means for initially positioning the auxiliary device 8 under container 1. For example, the prime mover 2 can be provided with means for pushing the auxiliary device 8 under container 1. Alternatively, the prime mover 2 can be used to pull the container 1 over the auxiliary device 8 with the distal end 7 of the container being dragged along the base surface 5 as the container 1 is pulled towards the prime mover 2. The container 1 is then lowered to rest on auxiliary device 8 and power applied to the support rollers 10 to initiate movement of the auxiliary device 8 towards the distal end 7 of container 1 with support rollers 10 engaging the bottom of container 1. The auxiliary device 8 raises the distal end 7 of container 1 from the base surface 5 as it travels beneath the container. The auxiliary device 8 is then guided to a suitable position under the container 1 as described above whereupon the container is ready to be moved.

The container 1 is then lowered by a procedure which is substantially the reverse of that described above. Again, it is possible to provide means for driving both the support rollers 10 as well as the traction wheels 9.

Figure 5:
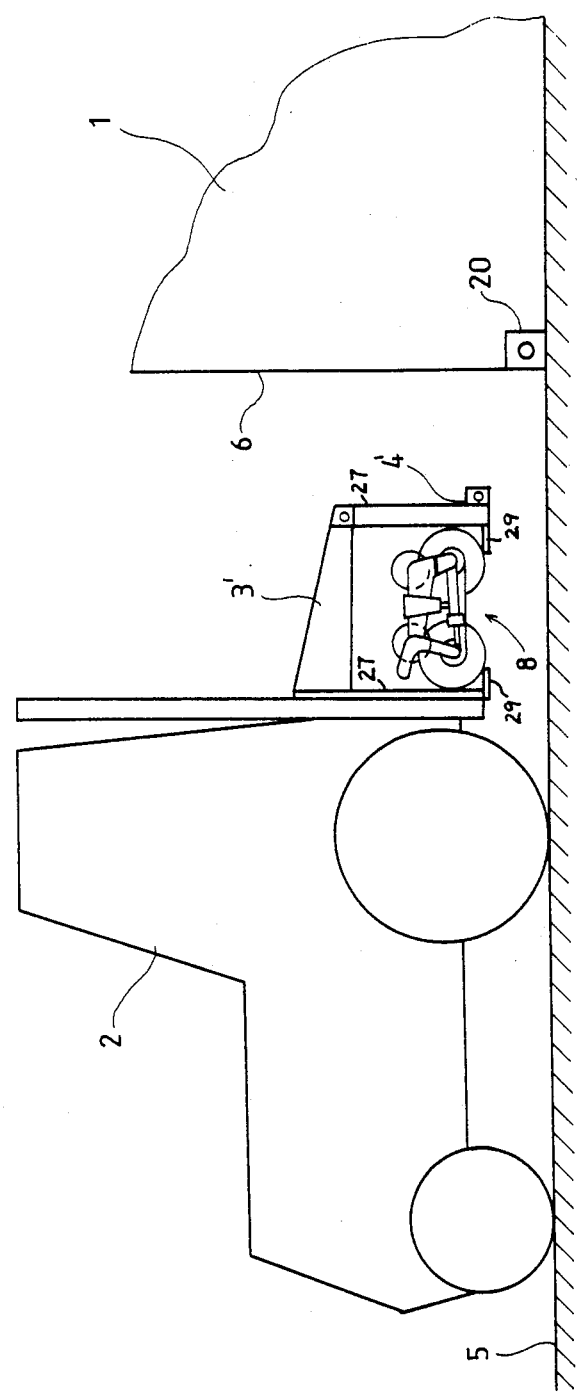
FIG. 5 is a schematic side elevation view of a modification of load handling apparatus in accordance with the invention wherein the prime mover and auxiliary device are in mutual engagement.

Referring now to FIG. 5, another embodiment of apparatus for handling unitary loads is illustrated which is especially adapted for moving containers 1. In this embodiment, the lifting unit of truck 2 is provided with an accessory 3' including pivotally connected engagement members 4' which engage openings 20 provided at the bottom corners of the proximal end 6 of container 1. The prime mover is also provided with means for attaching the auxiliary device 8 thereto when the auxiliary device 8 is not in use. Since the auxiliary device 8 is a unit which is separate from the prime mover 2, i.e., there is no structural attachment of the auxiliary device 8 to the prime mover 2, it is preferable that means for attaching the auxiliary device 8 to the prime mover 2 when the auxiliary device is not in use be provided. In the illustrated embodiment, the accessory 3' includes a pair of vertically extending members 27 which terminate at their lower ends with inwardly extending flanges 29. The member 27 nearest to the proximal end 6 of container 1 is pivotally mounted to permit the auxiliary device 8 to be received within the space defined between the members 27 whereupon the auxiliary device 8 can be engaged and supported by the flanges 29 as seen in FIG. 5.

In accordance with the invention, means are provided for operating the auxiliary device 8, either mechanically, hydraulically or electrically, from a remote position and most preferably from the cab of the prime mover 2. In a preferred embodiment, the auxiliary device 8 includes an electric motor for transmitting power to at least one of the traction wheels 9 and/or to one of the support rollers 10. Electric power may be provided to the electric motor such, for example, as by means of cables extending from the prime mover 2 to the auxiliary device 8. Moreover, the cables can be used to transmit other control signals to the auxiliary device, such as signals required for operating the locking means 13, 14. Most preferably, the electric motor for driving the auxiliary device 8 is run by rechargeable batteries so that in this embodiment, the auxiliary device 8 is a fully self-contained unit which can be operated by remote control means, such as by radio or infrared signals, or the like. In this embodiment, no cables are required between the auxiliary device 8 and the prime mover 2. If the auxiliary device 8 is equipped with both an electric motor and batteries, it is advantageous to provide means in the prime mover 2 for charging the batteries of the auxiliary device 8 when the latter is attached to the prime mover 2, such as is shown in FIG. 5. The batteries can, of course, also be charged in the conventional manner.

Although the load handling apparatus illustrated in the figures is shown as handling containers, it is understood that the apparatus can also be used in handling other unitary loads. In such cases, the engagement members of the prime mover are adapted for suitable engagement with the particular type of unitary load being handled.

The auxiliary device 8 can also be operated by hydraulic means in which case power is supplied by means of a flexible hydraulic hose extending from the prime mover. The auxiliary device must, of course, also be equipped with a brake for terminating its movement. In all cases, it is possible to provide the auxiliary device with safety means for preventing collision with obstacles and/or monitoring equipment for indicating the condition of the movement and operation of the auxiliary device at any given time.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for handling a unitary load resting on a surface, comprising:
   a prime mover comprising a vehicle having an operator compartment;
   means provided on said prime mover for engaging and raising an end of the load proximal to said prime mover from the surface on which it rests and so that an end of the load distal from said prime mover remains resting on the surface;
   mobile auxiliary means structurally separate from said prime mover for engaging the underside of and supporting the load, said auxiliary means including means for self-propelling the same;
   means situated in said operator compartment of said prime mover for controlling movement of said auxiliary means so that when the proximal end of the load is raised by said engaging and raising means of said prime mover with the distal end resting on said surface, said auxiliary means can be moved under the load in a direction towards the distal end thereof to engage the underside of the load and raise the distal end thereof from the surface on which it rests, said auxiliary means thereby supporting the load from its underside for movement; and
   means provided on said prime mover for engaging and supporting said auxiliary means when the latter is not supporting a load.

2. The combination of claim 1 wherein said auxiliary means further includes means for permitting movement of said auxiliary means with respect to the load in a longitudinal direction of the latter when the load is supported on said auxiliary means.

3. The combination of claim 2 wherein said auxiliary means further includes means for preventing longitudinal movement of said auxiliary means with respect to the load when the load is supported on said auxiliary means.

4. The combination of claim 1 wherein said auxiliary means further includes support rollers on which the load rests while the load is supported on said auxiliary means.

5. The combination of claim 4 wherein said support rollers of said auxiliary means include braking means for immobilizing said auxiliary means with respect to the load.

6. The combination of claim 1 wherein said auxiliary means further includes engagement means for locking said auxiliary means to the load.

7. The combination of claim 4 wherein said auxiliary means includes traction wheels for mobilizing said auxiliary means and further include motor means for driving at least one of said traction wheels and said support rollers.

8. The combination of claim 7 wherein said motor means comprises an electric motor.

9. The combination of claim 7 wherein said motor means are coupled to said prime mover by cables adapted to supply power to said motor means.

10. The combination of claim 9 wherein said auxiliary means further includes engagement means for locking said auxiliary means to the load, said support rollers of said auxiliary means further include braking means for immobilizing said auxiliary means with respect to the load, and wherein said engagement means and braking means are coupled to said prime mover by said cables for supplying power thereto.

11. The combination of claim 8 wherein said auxiliary means further includes self-contained power means for supplying power to said electric motor.

12. The combination of claim 11 wherein said self-contained power means include rechargeable batteries.

13. The combination of claim 12 further including means coupled to said prime mover for charging said batteries.

14. The combination of claim 7 wherein said means for controlling said auxiliary means comprise remote control means for wirelessly controlling said motor means.

15. The combination of claim 14 wherein said auxiliary means further includes engagement means for locking said auxiliary means to the load, said support rollers of said auxiliary means further including braking means for immobilizing said auxiliary means with respect to the load, and wherein said engagement means and braking means are controlled by said remote control means.

16. The combination of claim 7 wherein said motor means comprises a hydraulic motor and further including hydraulic hose means coupling said prime mover to said hydraulic motor for supplying said hydraulic motor with hydraulic power.

17. A method for handling a unitary load resting on a surface, comprising the steps of:
   moving a prime mover comprising a vehicle having raising means to one end of the load;
   coupling said one end of the load to said raising means;
   raising said one end of the load from the surface on which it rests so that a second end of the load remains resting on the ground;
   moving self-propelled auxiliary means which are structurally separate from said prime mover under the load with said second end of the load resting on the ground and then moving said auxiliary means in a direction towards said second end of the load to engage the underside of the load;
   continuing to move said self-propelled auxiliary means toward said second end of the load in engagement with the underside of the load to raise the second load end from the surface on which it rests so that said auxiliary means thereby supports the load from its underside for subsequent movement.

* * * * *